United States Patent [19]

Katsuie et al.

[11] Patent Number: 4,856,965
[45] Date of Patent: Aug. 15, 1989

[54] CONTROL SYSTEM OF PUMPING OPERATION USING AC EXCITING GENERATOR-MOTOR

[75] Inventors: Masahiro Katsuie; Michiyuki Abe, both of Tokyo; Katsuyuki Kawahara; Taizo Nakamura, both of Hachioji, all of Japan

[73] Assignees: The Tokyo Electric Power Co. Inc., Tokyo; Kabushiki Kaisha Toshiba, Kawasaki, both of Japan

[21] Appl. No.: 260,690

[22] Filed: Oct. 21, 1988

[30] Foreign Application Priority Data

Oct. 23, 1987 [JP] Japan .................. 62-267913

[51] Int. Cl.[4] .................................. F04B 49/02
[52] U.S. Cl. ..................................... 417/19; 417/38; 318/798
[58] Field of Search ................ 417/19, 38; 415/500; 290/52, 23, 24

[56] References Cited

U.S. PATENT DOCUMENTS

| | | | |
|---|---|---|---|
| 4,382,745 | 5/1983 | Kuwabara et al. | 415/1 |
| 4,625,125 | 11/1986 | Kuwabara | 290/52 |
| 4,641,040 | 2/1987 | Megnint | 290/52 |
| 4,743,827 | 5/1988 | Shiozaki et al. | 318/798 |
| 4,754,156 | 6/1988 | Shiozaki et al. | 290/52 |

FOREIGN PATENT DOCUMENTS

| | | | |
|---|---|---|---|
| 200081 | 4/1986 | European Pat. Off. | |
| 2845930 | 7/1979 | Fed. Rep. of Germany | |
| 61-149582 | 7/1986 | Japan | 417/19 |
| 0099677 | 5/1987 | Japan | 415/500 |
| 2054975 | 7/1979 | United Kingdom | |

OTHER PUBLICATIONS

Patent Abstracts of Japan—vol. 9, No. 73 (M—368) 6/1796, Apr. 3, 1985, & JP-A-59 203883 (Hitachi Seisakusho K.K.).

*Primary Examiner*—Carlton R. Croyle
*Assistant Examiner*—D. Scheuermann
*Attorney, Agent, or Firm*—Oblon, Spivak, McClelland, Maier & Neustadt

[57] ABSTRACT

A control system of pumping operation comprises a cycloconverter for converting AC power from a AC power system into AC power having a given frequency, an AC exciting generator-motor, having a stator side electrically connected to the AC power system, having a rotor side electrically connected to the cycloconverter, and having a rotor shaft mechanically coupled to a pump-turbine by which the pumping operation is carried out, a circuit breaker inserted between the AC power system and the AC exciting generator-motor, a rotation speed controller for controlling a rotation speed of the AC exciting generator-motor such that the rotation speed becomes slow when the pumping operation is to be stopped, an AC excitation controller for decreasing a degree of excitation effected by the cycloconverter, wherein decreasing of the excitation degree starts when the rotation speed of the AC exciting generator-motor reaches a given minimum value, and a circuit breaker controller for turning off the circuit breaker when input power, supplied from the AC power system to the AC exciting generator-motor becomes substantially zero.

16 Claims, 7 Drawing Sheets

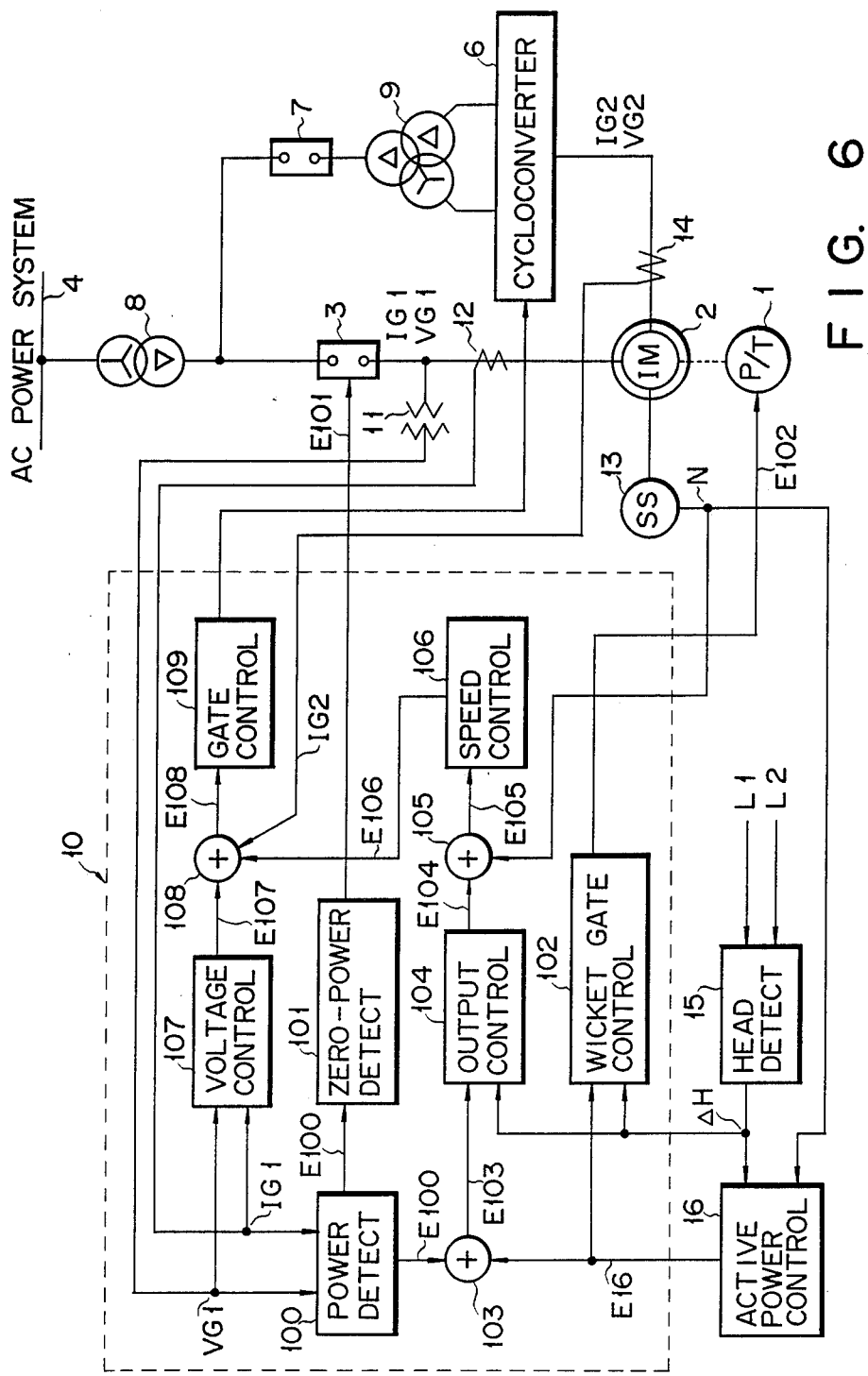
F I G. 6

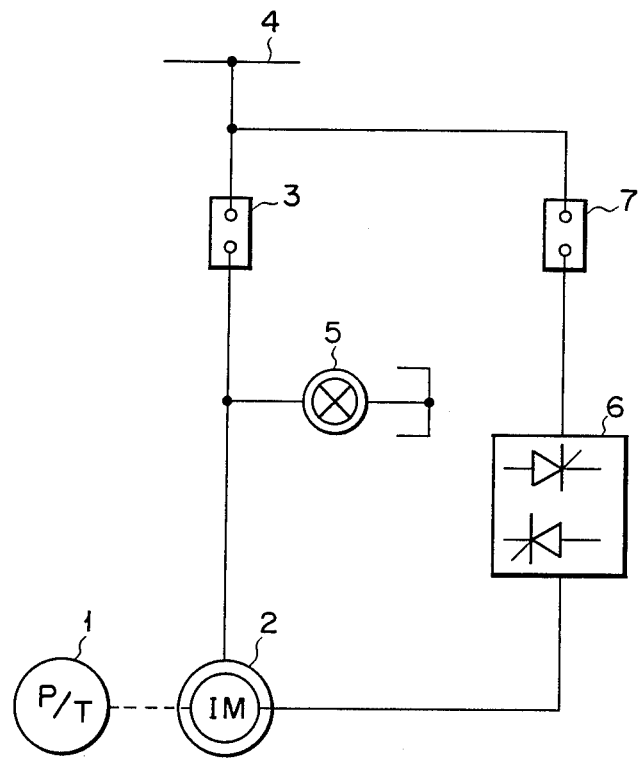
F I G. 7

CONTROL SYSTEM OF PUMPING OPERATION USING AC EXCITING GENERATOR-MOTOR

BACKGROUND OF THE INVENTION

1. Field of the Invention

This invention relates to a control system of pumping operation using an AC exciting generator-motor, which is applied to a variable speed system of a pumped storage power plant, and, particularly, to an improved manner of stopping the pumping operation thereof.

2. Description of the Related Art

Recent pumped storage power plants have tendencies to enhance their power capacities as well as to expand their heads between upper and lower reservoirs in view of their conditions of location and/or their operational efficiencies. Conventionally, a sync machine is used as the generator-motor of the power plant, and, therefore, the rotation speed thereof is fixed at constant.

In such a power plant, when the pumping operation must stop, the wicket gate of the reversible pump-turbine is controlled to be closed or squeezed, and when the opening of the wicket gate falls under a predetermined degree, the generator-motor is disconnected (parallel CB off) from the power system.

According to a conventional pumping operation stopping control, however, the degree of squeezing the opening of the wicket gate does not proportionally correspond to the input power of the generator-motor. For instance, when the opening of the wicket gate is squeezed to 20% of the full opening, the input power is decreased to only 70–80% of the power used in the operating head or pumping head.

This means that a parallel circuit breaker (CB) must disconnect the generator-motor from the power system under a condition that the generator-motor is supplied with a certain input power. Such input power becomes large as the power capacity of the generator-motor is increased.

Under such circumstances, when the pumping operation is stopped, power fluctuations in the power system, caused by the parallel CB off of the circuit breaker, are liable to occur. Further, the parallel CB off with large input power of the generator-motor shortens the life of the circuit breaker.

An AC exciting generator-motor can be used in place of a conventional sync machine. In this case the rotor side of the generator-motor is connected to a cycloconverter, to thereby constitute a variable speed system.

FIG. 7 shows a main circuit configuration of such a variable speed system for a pumped storage power plant. In the figure, the rotor shaft of AC exciting generator-motor (IM) 2 is mechanically coupled to reversible pump-turbine 1 directly. The stator side of generator-motor 2 is electrically connected to power system 4, via parallel circuit breaker 3. Also connected to the stator side is breaking disconnecting switch 5.

Incidentally, the exciting magnetic field of AC exciting generator-motor 2 is synchronized with the frequency of system 4, but the rotation speed of the rotor thereof is independent of the system frequency.

The input side of cycloconverter 6 is electrically connected to power system 4, via circuit breaker 7 of the cycloconverter. Cycloconverter 6 converts the frequency of the power from system 4 into a prescribed frequency. The frequency-converted power from cycloconverter 6 is applied to the rotor side of AC exciting generator-motor 2.

In the above variable speed system, the degree of opening of the wicket gate of reversible pump-turbine 1 and the rotation speed thereof are controlled to be proper values in accordance with the pumping head (or simply, head) obtained at the time of pumping operation. By such control according to the wicket gate opening degree and the rotation speed, the AC exciting generator-motor can perform the pumping operation with a given amount of power corresponding to excess power in the system.

For a process from the pumping-operation state to the completely-stopped state of generator-motor 2, the key point of the above variable speed system resides in a manner of decreasing the input power of generator-motor 2.

In manner to achieve the above key point, the input power of generator-motor 2 is reduced to decrease the rotation speed of reversible pump-turbine 1 while controlling the wicket gate to be closed.

However, if the rotation speed of reversible pump-turbine 1 is largely decreased, the pump-discharge pressure of pump-turbine 1 is excessively reduced so that the operation of pump-turbine 1 enters the reverse pumping area. In the reverse pumping area, a reverse flow of water from an upper reservoir to a lower reservoir happens even if pump-turbine 1 operates in the pumping mode. When such a reverse flow happens, vibrations and/or temperature-rise due to agitating or dispersing loss in pump-turbine 1 occur. An operation with such vibrations/temperature-rise cannot be continued. Consequently, when this is the case, generator-motor 2 has to be parallel CB off (or switch-off) from power system 4, with certain input power.

Thus, for a pumped storage power plant in which numerous start/stop operations are to be done, the above-mentioned control will shorten not only the life of the pump-turbine but also lessen that of the circuit breaker (parallel CB), with substantial fluctuations in the power system connected to the pump-turbine.

SUMMARY OF THE INVENTION

It is accordingly an object of the present invention to provide a control system of pumping operation using an AC exciting generator-motor, by which fluctuations in the power system can be lessened and can prevent reduction of the life of a circuit breaker and/or reversible pump-turbine.

To achieve the above object, a system of the present invention controls to decrease the rotation speed of an AC exciting generator-motor (wound-rotor type variable speed AC motor). The opening of the wicket gate of reversible pump-turbine is controlled to be closed or squeezed in response to the controlled rotation speed of the generator-motor. When the rotation speed of the AC exciting generator-motor is decreased to a given minimum speed at the pumping head, an amount of AC excitation for the generator-motor is controlled such that the input power of the generator-motor becomes substantially zero. After the input power becomes substantially zero, the generator-motor is subjected to a parallel CB off.

BRIEF DESCRIPTION OF THE DRAWINGS

FIG. 6 is a block diagram showing an example of the controller (10) used in the embodiment of FIG. 1; and FIG. 7 shows a material part of a variable speed system for a pumped storage power plant, which is used for explaining the background art of this invention.

DETAILED DESCRIPTION OF THE PREFERRED EMBODIMENTS

Figure 1:
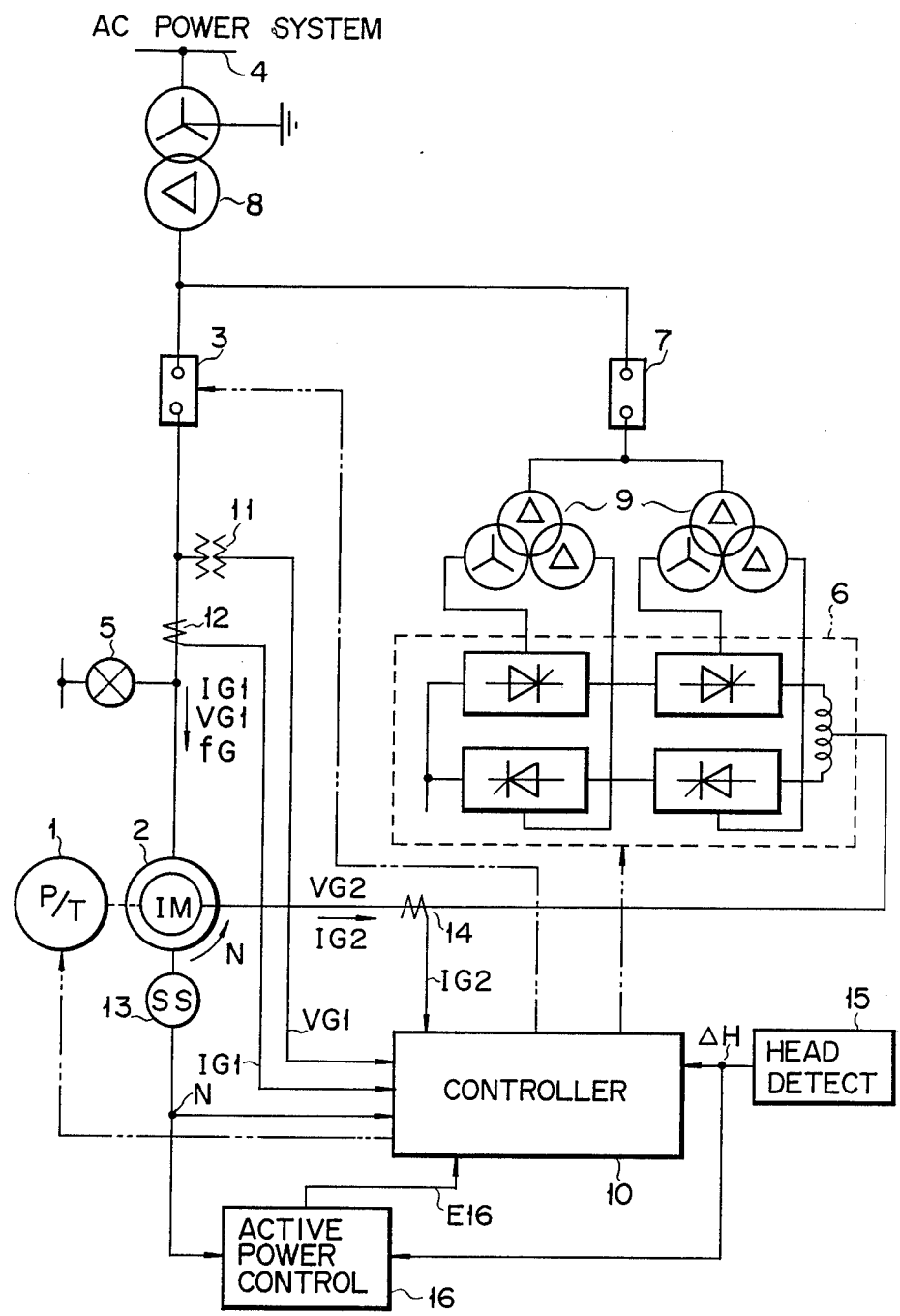
FIG. 1 shows a configuration of a control system of pumping operation using an AC exciting generator motor according to an embodiment of this invention.

Preferred embodiments of this invention will be described with reference to the accompanying drawings. In the description the same or functionally equivalent elements are denoted by the same or similar reference numerals, to thereby simplify the description.

FIG. 1 shows a configuration of a control system of pumping operation using an AC exciting generator-motor according to an embodiment of this invention.

The rotor shaft of 3-phase AC exciting generator-motor (wound-rotor type) 2 is mechanically coupled to reversible pump-turbine 1 directly. The stator of generator-motor 2 is electrically connected to 3-phase AC power system 4, via parallel CB (circuit breaker) 3 and main power transformer 8. The stator of generator-motor 2 is also connected to breaking disconnecting switch 5.

Circulating current type cycloconverter 6 changes the frequency (e.g., 50 Hz) of power system 4 by a prescribed frequency (e.g., 0 to +5 Hz) and controls its output voltage VG2 as well as its output current IG2. The input side of cycloconverter 6 is connected to power system 4, via cycloconverter power transformers 9 and cycloconverter circuit breaker 7. The output side of cycloconverter 6 is connected to the rotor side of AC exciting generator-motor 2.

Controller 10 sends commands to reversible pump-turbine 1, parallel CB 3, and cycloconverter 6. According to these commands, the control for opening of the wicket gate of pump-turbine 1, the shutdown (parallel off) of CB 3, the rotation speed control of generator-motor 2, and the active power control are effected.

Process variables for obtaining the above commands are input to controller 10. More specifically, controller 10 receives signals VG1, IG1, IG2, N, and ΔH. Signal VG1 is obtained by detecting the input voltage (VG1) of generator-motor 2, via potential transformer 11. Signal IG1 is obtained by detecting the input current (IG1) of generator-motor 2, via current transformer 12. Signal IG2 is obtained by detecting the output current (IG2) of cycloconverter 6, via current transformer 14. Signal N is obtained by detecting the rotation speed (N) of generator-motor 2, via speed sensor (tachometer) 13. Signal ΔH is obtained by detecting the pumping head at the time of pumping operation, via head detector 15.

Active power controller 16 detects whether the rotation speed of pump-turbine 1 reaches a prescribed speed for the current pumping head. When controller 16 detects that pump-turbine 1 reaches the prescribed speed, it sends a result (E16) of the detection to controller 10.

Figure 2:
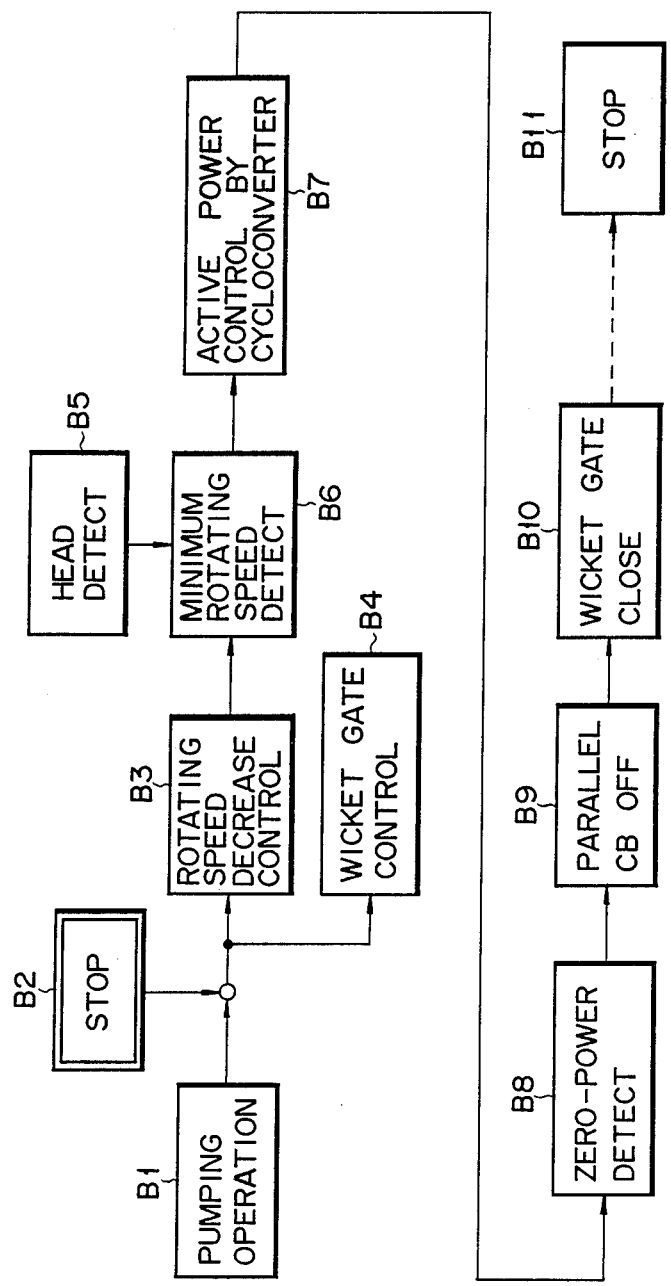
FIG. 2 is a block diagram explaining the control sequence for stopping the pumping operation of the embodiment of FIG. 1.

FIG. 2 is a block diagram explaining the control sequence for stopping the pumping operation of the embodiment of FIG. 1. FIGS. 3A-3J are timing charts illustrating the pumping operation stopping control for the embodiment of FIG. 1. The manner of operating the control system of this invention will now be described with reference to these figures.

Assume that during the pumping operation (B1 in FIG. 2) a stop command (B2 in FIG. 2) is generated at time t1. Then, controller 10 controls output current IG2 (FIG. 3H) and output voltage VG2 of cycloconverter 6 such that rotation speed N (FIG. 3J) of AC exciting generator-motor 2 decreases (B3 in FIG. 2).

Figure 3:
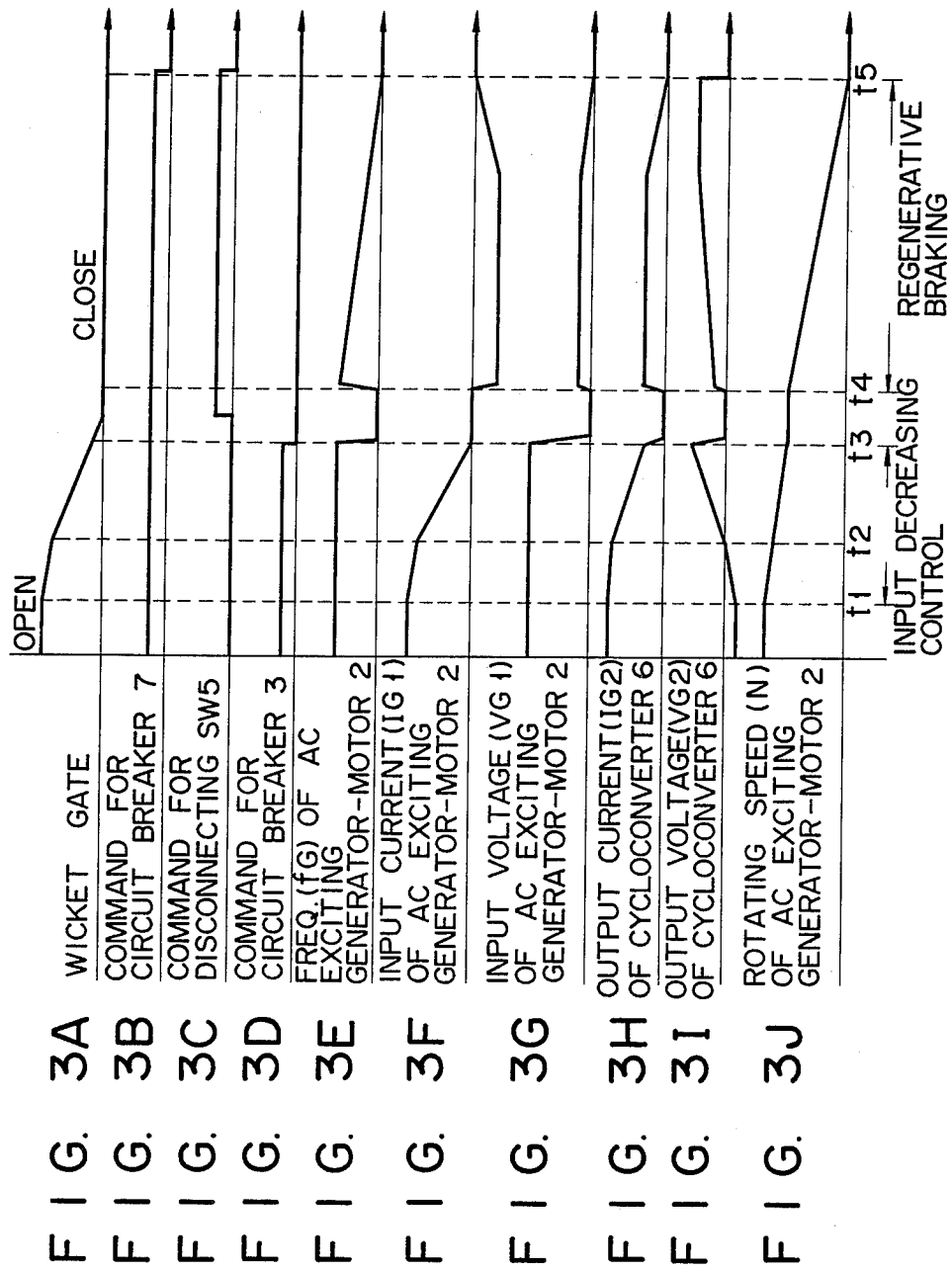
FIGS. 3A-3J are timing charts illustrating the pumping operation stopping control for the embodiment of FIG. 1.

The degree of opening (FIG. 3A) of the wicket gate of reversible pump-turbine 1 is controlled by controller 10 to be a specific opening degree. This specific opening degree is determined by an arithmetic calculation based on pumping head ΔH, detected by head detector 15, and rotation speed N of generator-motor 2, detected by speed sensor 13 (B4 in FIG. 2). Then, the pump input power of pump-turbine 1 or input current IG1 (FIG. 3F) of generator-motor 2 decreases in proportion to rotation speed N (FIG. 3J).

At time t2, rotation speed N (FIG. 3J) of generator-motor 2 reaches a minimum rotation speed which depends on the pumping head (B5 in FIG. 2) detected at time t2. This minimum rotation speed represents the minimum value for preventing occurrence of reverse pumping in reversible pump-turbine 1. At time t2, active power controller 16 detects the minimum value of rotation speed N (B6 in FIG. 2), so that the active power control for generator-motor 2 by means of cycloconverter 6 starts (B7 in FIG. 2). By this control, input current IG1 (FIG. 3F) of generator-motor 2 is controlled to be zero.

Figure 4:
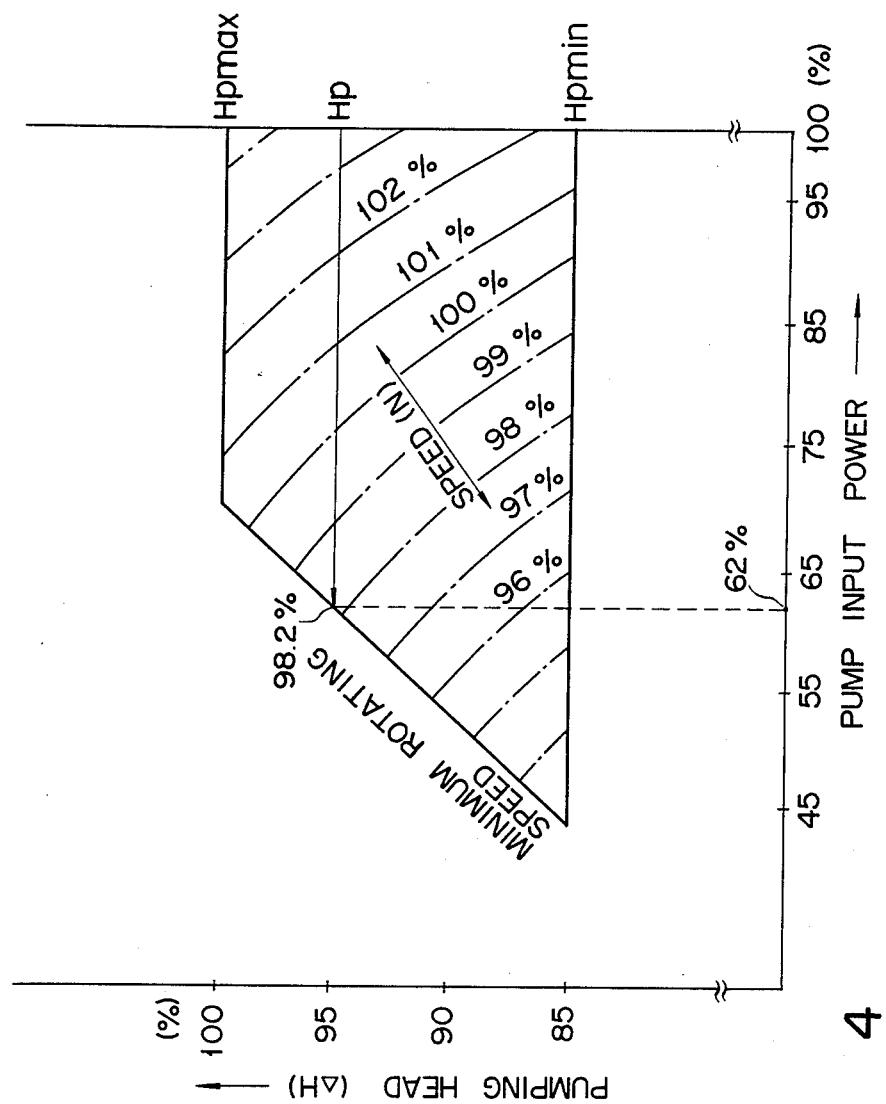
FIG. 4 is a graph illustrating the relation among the pumping head of the reversible pump-turbine, the pump input power of the AC exciting generator-motor, and the rotation speed of the generator-motor.

FIG. 4 shows a relation among pumping head ΔH of reversible pump-turbine 1, the pump input power of AC exciting generator-motor 2, and rotation speed N of generator-motor 2. The detection of the minimum rotation speed by means of active power controller 16 is carried out, using output ΔH detector 15 and output N of sensor 13, according to the minimum rotation speed characteristic as is shown in FIG. 4.

For instance, assume that the pumping head represented by output ΔH of detector 15 is denoted by Hp. In this case, the minimum rotation speed at head Hp, which represents the boundary of occurrence of reverse pumping, is 98.2% of the rated speed, as is illustrated in FIG. 4. Further, in this case, the pump input power is 62% of the rated value as is shown in FIG. 4. Incidentally, the above minimum rotation speed becomes high as the value of pumping head Hp becomes large.

At time t3, input current IG1 (FIG. 3F) of generator-motor 2 is rendered to be zero with the active power control for generator-motor 2 by cycloconverter 6. When current IG1=0, or input power=0, is detected in controller 10 (B8 in FIG. 2), a parallel off command (FIG. 3D) is sent from controller 10 to parallel CB 3.

Parallel CB 3 is cutoff by the parallel off command (B9 in FIG. 2) so that input voltage VG1 (FIG. 3G) of generator-motor 2 is reduced to zero. At the same time, the wicket gate of reversible pump-turbine 1 is fully closed (B10 in FIG. 2), and a gate block command is sent from controller 10 to cycloconverter 6 so that output voltage VG2 (FIG. 3I) and output current IG2 (FIG. 3H) of cycloconverter 6 are reduced to zero. The resultant VG2=0 renders frequency fG (FIG. 3E) of generator-motor 2 to zero.

When input voltage VG1 (FIG. 3G) of generator-motor 2 becomes zero, breaking disconnecting switch 5 is turned on (from t3 to t4 in FIG. 3C) for effecting regenerative braking. Following to this, gate signals of cycloconverter 6 are de-blocked at time t4, and an AC excitation is effected on generator-motor 2. This excitation applies regenerative braking to generator-motor 2, so that the rotation speed thereof rapidly decreases. When generator-motor 2 completely stops at time t5, cycloconverter 6 is again subjected to gate-blocking, to thereby release the regenerative braking (B11 in FIG. 2). Also at time t5, breaker 7 of cycloconverter 6 becomes off (FIG. 3B).

Incidentally, electrical braking obtained by applying a DC excitation to generator-motor 2 can be utilized to stop generator-motor 2.

Figure 5:
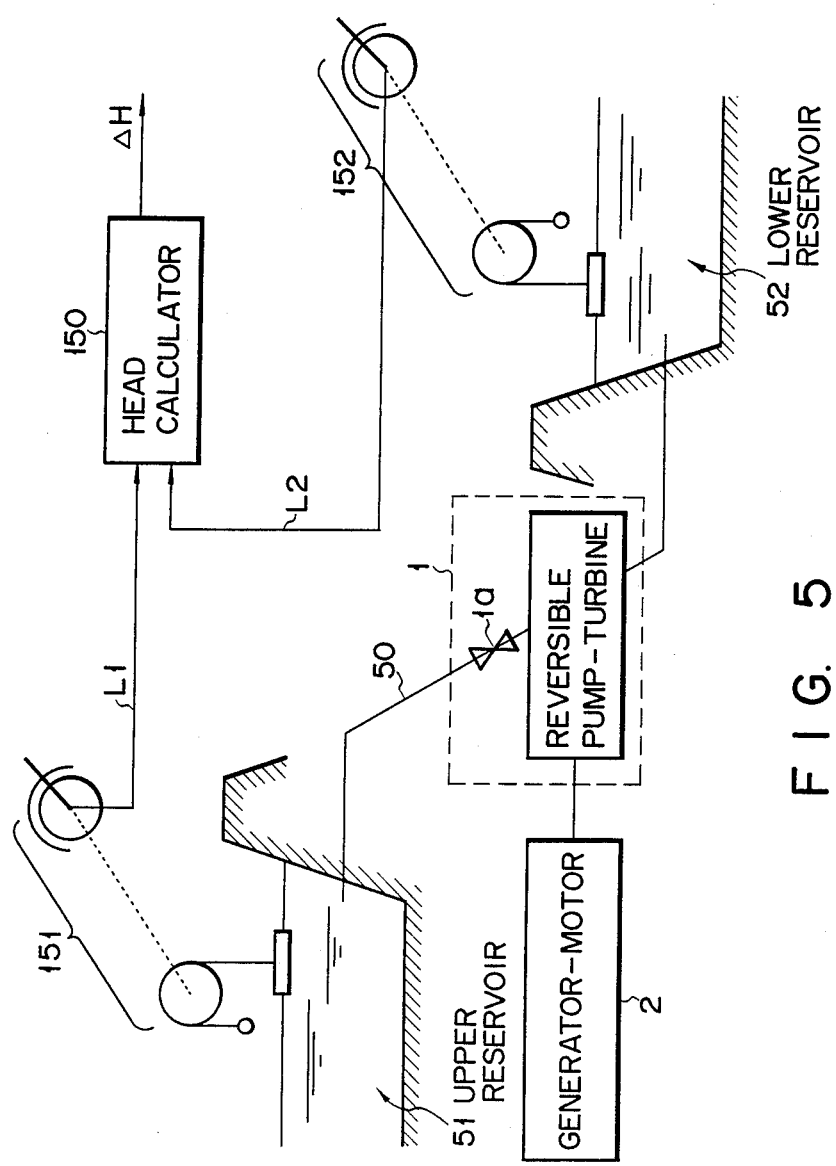
FIG. 5 is a block diagram showing an example of the head detector (15) used in the embodiment of FIG. 1.

FIG. 5 is a block diagram showing an example of head detector 15 used in the embodiment of FIG. 1. Lower reservoir 52 is connected to upper reservoir 51 via pipe 50 which is passing through reversible pump-turbine 1 and wicket gate 1a. Water level sensor 151 detects the water level of upper reservoir 51 and provides potential signal L1 proportional to the upper reservoir water level. Water level sensor 152 detects the water level of lower reservoir 52 and provides potential signal L2 proportional to the lower reservoir water level. Signals L1 and L2 are input to head calculator 150. Calculator 150 detects the potential difference between signals L1 and L2, and outputs signal ΔH proportional to the detected potential difference.

FIG. 6 is a block diagram showing an example of controller 10 used in the embodiment of FIG. 1. Input voltage and input current to the stator winding of AC exciting generator-motor 2 are denoted by signals VG1 and IG1, respectively. Signals VG1 and IG1 are input to power detector 100. Detector 100 detects the in-phase components of input signals VG1 and IG1, and generates power signal E100 from the product of these in-phase components. Power signal E100 represents the active power input to the stator of generator-motor 2.

Power signal E100 from detector 100 is input to zero-power detector 101. Detector 101 compares the level of input power signal E100 with a given comparison level corresponding to the zero-power. When the level of signal E100 falls under the comparison level, detector 101 sends parallel off command E101 to parallel CB 3 so that CB 3 is turned off.

Output signal N of speed sensor 13 and output signal ΔH of head detector 15 are both input to active power controller 16. Controller 16 is provided with a data table indicating of a characteristic as is shown in FIG. 4. Such a data table is predetermined for each of actual pumping operation systems. Controller 16 compares input signals N and ΔH with the data table and generates signal E16 for determining the opening of wicket gate 1a and the AC exciting amount (VG2·IG2) applied from cycloconverter 6 to generator-motor 2.

Signals E16 and ΔH are input to wicket gate controller 102. Controller 102 supplies the wicket gate (1a) of reversible pump-turbine 1 with signal E102 for controlling the opening of the wicket gate. The opening of the wicket gate is largely closed or squeezed as the signal level of E16 becomes low or as the signal level of ΔH becomes high.

Signal E16 from controller 16 is supplied as a power reference to adder 103. Adder 103 also receives signal E100 from power detector 100. Error signal E103 of signal E100 with respect to signal E16 is supplied from adder 103 to output controller 104. Controller 104 receives output signal ΔH from head detector 15, and outputs error signal E104 corresponding to E103. Error signal E104 is weighted by the magnitude of signal ΔH in controller 104.

Error signal E104 is supplied as a speed reference to adder 105. Adder 105 also receives output signal N from speed sensor 13. Error signal E105 of signal E104 with respect to signal N is input to speed controller 106. Controller 106 amplifies input signal E105, and sends amplified signal E106 to adder 108.

Adder 108 also receives signal E107 corresponding to both voltage and current signals VG1 and IG1, and current signal IG2 representing a current from cycloconverter 6 to generator-motor 2. Composite signal E108 of signals E106, E107, and IG2 is input to gate controller 109. Controller 109 performs on/off control of switching elements contained in cycloconverter 6.

Although the embodiment of FIG. 1 employs 3-phase equipment (2, 6, 9), the scope of the present invention is not limited to 3-phase. Further, cycloconverter 6 may be a variable frequency AC power source other than a cycloconverter. Any other hydraulic machine can be used in place of or together with reversible pump-turbine 1.

As mentioned above, according to the present invention, when the pumping operation of a pumped storage power plant is to be stopped, rotation speed N of AC exciting generator-motor 2 is reduced by the control of controller 10. At this time, the opening of the wicket gate of reversible pump-turbine 1 is closed in response to the reduction in speed N. Rotation speed N of AC exciting generator-motor 2 is reduced to the minimum speed for the current pumping head. Then, active power control for generator-motor 2 is performed, and when the input power of generator-motor 2 becomes zero, parallel CB 3 is turned off.

Since the parallel CB off is carried out at the input power zero condition, power system 4 can be free of fluctuations at the time of stop of the pumping operation, and, in addition, the life of parallel CB 3 is not reduced by the repetitive parallel CB off operations. Further, since reversible pump-turbine 1 can be stopped without unsuitable reverse pumping operation, the life of pump-turbine 1 can be expanded.

While the invention has been described in connection with what is presently considered to be the most practical and preferred embodiment, it is to be understood that the invention is not limited to the disclosed embodiment but, on the contrary, is intended to cover various modifications and equivalent arrangements included within the scope of the appended claims, which scope is to be accorded the broadest interpretation so as to encompass all such modifications and equivalent arrangements.

What is claimed is:

1. A control system of pumping operation comprising:
   power source means, coupled to an AC power system, for converting AC power from the AC power system into AC power having a given frequency;
   an AC exciting generator-motor, having a stator side electrically connected to said AC power system, having a rotor side electrically connected to said power source means, and having a rotor shaft mechanically coupled to a pump-turbine by which the pumping operation is carried out;

a circuit breaker inserted between said AC power system and the stator side of said AC exciting generator-motor;

rotation speed control means, coupled to said AC exciting generator-motor and said power source means, for controlling a rotation speed of said AC exciting generator-motor such that the rotation speed becomes slow when the pumping operation is to be stopped;

AC excitation control means, coupled to said power source means which excites the rotor side of said AC exciting generator-motor, for decreasing a degree of the excitation effected by said power source means, wherein the decreasing of the excitation degree starts when the rotation speed of said AC exciting generator-motor, reduced by said rotation speed control means, reaches a predetermined specific value; and circuit breaker off means, coupled to said circuit breaker and said AC exciting generator-motor, for turning off said circuit breaker when input power, supplied from said AC power system to the stator side of said AC exciting generator-motor, becomes substantially zero.

2. A control system according to claim 1, wherein said pump-turbine is provided with a wicket gate located at a water path of said pump-turbine, said control system further comprising:

wicket gate control means, coupled to said wicket gate and said AC exciting generator-motor, for closing or squeezing the opening of said wicket gate in response to a reduction in the rotation speed of said AC exciting generator-motor.

3. A control system according to claim 2, wherein said pump-turbine includes a reversible pump-turbine for pumping water from a lower reservoir to an upper reservoir, said control system further comprising:

head detector means for detecting a pumping head defined between a water level of the upper reservoir and a water level of the lower reservoir, and supplying said wicket gate control means with a head signal representing the detected pumping head, wherein said wicket gate control means closes the opening of said wicket gate in accordance with said head signal and with the rotation speed of said AC exciting generator-motor.

4. A control system according to claim 1, wherein said power source means includes:

cycloconverter means for converting the AC power from said AC power system into a variable-frequency polyphase AC power.

5. A control system according to claim 1, wherein said pump-turbine includes a reversible pump-turbine for pumping water from a lower reservoir to a upper reservoir, and reverse flow of water from the upper reservoir to the lower reservoir is prevented if the rotation speed of said AC exciting generator-motor is equal to or more than a given minimum value defined by said predetermined specific value.

6. A control system according to claim 1, wherein said rotation speed control means includes:

first means for detecting the rotation speed of said AC exciting generator-motor to provide a rotation speed signal;

second means for detecting input power of the stator side of said AC exciting generator-motor to provide an input power signal;

third means for producing an output control signal in response to an error signal between a predetermined signal and said input power signal;

fourth means for producing a rotation speed control signal in response to an error signal between said rotation speed signal and said output control signal;

fifth means for detecting an input voltage of the stator side of said AC exciting generator-motor to provide an input voltage signal;

sixth means for detecting an AC excitation current of the rotor side of said AC exciting generator-motor to provide an excitation current signal; and seventh means for controlling said power source means so that the rotation speed of said AC exciting generator-motor is decreased in response to a combination of said rotation speed control signal, said input voltage signal, and said excitation current signal.

7. A control system according to claim 1, wherein said circuit breaker off means includes:

means for detecting input power supplied from said AC power system to the stator side of said AC exciting generator-motor to provide an input power signal; and means for turning off said circuit breaker when said input power signal represents zero of said input power.

8. A control system of pumping operation comprising:

frequency-variable power source means, coupled to a 3-phase AC power system, for converting 3-phase AC power from the 3-phase AC power system into 3-phase AC power having a given variable frequency;

an AC exciting generator-motor, having a stator side electrically connected to said 3-phase AC power system, having a rotor side electrically connected to said frequency-variable power source means, and having a rotor shaft mechanically coupled to a reversible pump-turbine by which the pumping operation is carried out;

a circuit breaker inserted between said 3-phase AC power system and the stator side of said AC exciting generator-motor;

rotation speed control means, coupled to said AC exciting generator-motor and said frequency-variable power source means, for controlling a rotation speed of said AC exciting generator-motor such that the rotation speed becomes slow when the pumping operation is to be stopped;

AC excitation control means, coupled to said frequency-variable power source means which excites the rotor side of said AC exciting generator-motor, for decreasing a degree of the excitation effected by said frequency-variable power source means, wherein the decreasing of the excitation degree starts when the rotation speed of said AC exciting generator-motor, reduced by said rotation speed control means, reaches a predetermined specific value; and circuit breaker off means, coupled to said circuit breaker and said AC exciting generator-motor, for turning off said circuit breaker when input power, supplied from said 3-phase AC power system to the stator side of said AC exciting generator-motor, becomes substantially zero.

9. A control system according to claim 8, wherein said reversible pump-turbine is provided with a wicket gate located at a water path of said pump-turbine, said control system further comprising:

wicket gate control means, coupled to said wicket gate and said AC exciting generator-motor, for closing or squeezing the opening of said wicket gate in response to a reduction in the rotation speed of said AC exciting generator-motor.

10. A control system according to claim 9, further comprising:

head detector means for detecting a pumping head defined between a water level of the upper reservoir and a water level of the lower reservoir, and supplying said wicket gate control means with a head signal representing the detected pumping head, wherein said wicket gate control means closes the opening of said wicket gate in accordance with said head signal and with the rotation speed of said AC exciting generator-motor.

11. A control system according to claim 8, wherein said frequency-variable power source means includes:

a cycloconverter for converting the AC power from said 3-phase AC power system into a variable-frequency 3-phase AC power.

12. A control system according to claim 8, which is constructed such that reverse water flow of said reversible pump-turbine, caused by a water pressure between the upper reservoir and the lower reservoir, is prevented under condition that the rotation speed of said AC exciting generator-motor is lower than a predetermined minimum value.

13. A control system according to claim 8, wherein said rotation speed control means includes:

rotation speed detector means for detecting the rotation speed of said AC exciting generator-motor to provide a rotation speed signal;

input power detector means for detecting input power of the stator side of said AC exciting generator-motor to provide an input power signal;

output control signal means for producing an output control signal in response to an error signal between a given signal and said input power signal;

speed control signal means for producing a rotation speed control signal in response to an error signal between said rotation speed signal and said output control signal; and input voltage detector means for detecting an input voltage of the stator side of said AC exciting generator-motor to provide an input voltage signal.

14. A control system according to claim 13, wherein said AC excitation control means includes:

means for detecting an AC excitation current supplied from said frequency-variable power source means to the rotor side of said AC exciting generator-motor, and providing an excitation current signal; and means for controlling said frequency-variable power source means so that the rotation speed of said AC exciting generator-motor is decreased in response to a combination of said rotation speed control signal, said input voltage signal, and said excitation current signal.

15. A control system according to claim 8, wherein said circuit breaker off means includes:

means for detecting input power supplied from said 3-phase AC power system to the stator side of said AC exciting generator-motor, and providing an input power signal; and means for turning off said circuit breaker when said input power signal represents zero of said input power.

16. A control system of pumping operation for a pumped storage power plant, which includes an AC exciting generator-motor, having a rotor shaft mechanically coupled to a reversible pump-turbine provided with a wicket gate, having a stator side electrically connected to an AC power system, via a parallel circuit breaker, and having a rotor side electrically connected to a cycloconverter by which a frequency of power from the AC power system is converted into a prescribed frequency power, said control system performing the following control when pumping operation of the pumped storage power plant is to be stopped:

(a) reducing a rotation speed of said AC exciting generator-motor;

(b) closing opening of the wicket gate of said reversible pump-turbine;

(c) decreasing an AC excitation for said AC exciting generator-motor by said cycloconverter when the rotation speed of said AC exciting generator-motor is reduced to a given minimum value determined at a current pumping head;

(d) circuit-breaking said AC exciting generator-motor from said AC power system by said parallel circuit breaker when input power to the stator side of said AC exciting generator-motor becomes substantially zero.

* * * * *